Jan. 28, 1969  J. D. ROBINSON  3,425,049

VOLTAGE TEST DEVICE

Filed Nov. 4, 1965

Inventor,
Jack D. Robinson,
by Gilbert P. Tarleton
His Attorney.

United States Patent Office 3,425,049
Patented Jan. 28, 1969

3,425,049
VOLTAGE TEST DEVICE
Jack D. Robinson, Pittsfield, Mass., assignor to General Electric Company, a corporation of New York
Filed Nov. 4, 1965, Ser. No. 506,347
U.S. Cl. 340—214                    6 Claims
Int. Cl. G08b 29/00

ABSTRACT OF THE DISCLOSURE

A voltage test device for an electric power system characterized by having a voltage-indicating signal means, the integrity of which can be verified without interrupting the indicating capability of the signal means. A structurally and electrically independent source of voltage is used to verify the operativeness of an indicating signal means that is physically mounted adjacent a normally charged conductive member.

---

This invention relates to voltage test devices and more particularly to such devices for use in electric power systems.

The trend toward underground electric power transmission and distribution systems has created a need for a highly reliable voltage indicator. This is because the normally current carrying conductors which are normally charged to a high potential relative to ground are entirely enclosed in insulation usually covered by an outer protective and conductive grounded sheath or shield. It is, therefore, difficult to gain access to such conductors to determine whether they are charged at times when trouble in the system, or any other reason, makes it necessary to change connections. If the conductor is charged at a time when an attempt is made to change connections, disastrous and hazardous power arcs may be drawn.

Such power systems may comprise various modules such as transformers, switches and multi-junctions all interconnected by insulated cable with standard detachable connectors between the cable terminations and the modules. A simple and fairly reliable device for indicating whether or not the current carrying parts are charged is a glow discharge lamp such as a neon glow lamp located at each connector and capacitively coupled through the insulation to the current carrying parts so that when they are charged the lamp will be lighted.

However, such lamps and connections, or both, may fail in which case a darkened lamp could provide a false indication of absence of voltage on the current carrying parts with the possibility of disastrous and even lethal results if an attempt is made to change connections.

In accordance with the present invention, there is provided a novel and simple device or system for testing the integrity of the element and its connections which signals the presence or absence of voltage. Briefly described, this is an auxiliary source of potential and auxiliary connection therefor for applying a test voltage to the signal element through its normal energizing connections.

An object of the invention is to provide a novel and simple voltage test device or system.

Another object of the invention is to provide a novel and simple device or system for testing in situ the integrity of a voltage signaling element and its normal energizing connections.

A further object of the invention is to provide a novel and simple voltage test device for underground electric power systems.

The invention will be better understood from the following description taken in connection with the accompanying drawing and its scope will be pointed out in the appended claims.

Figure 1:
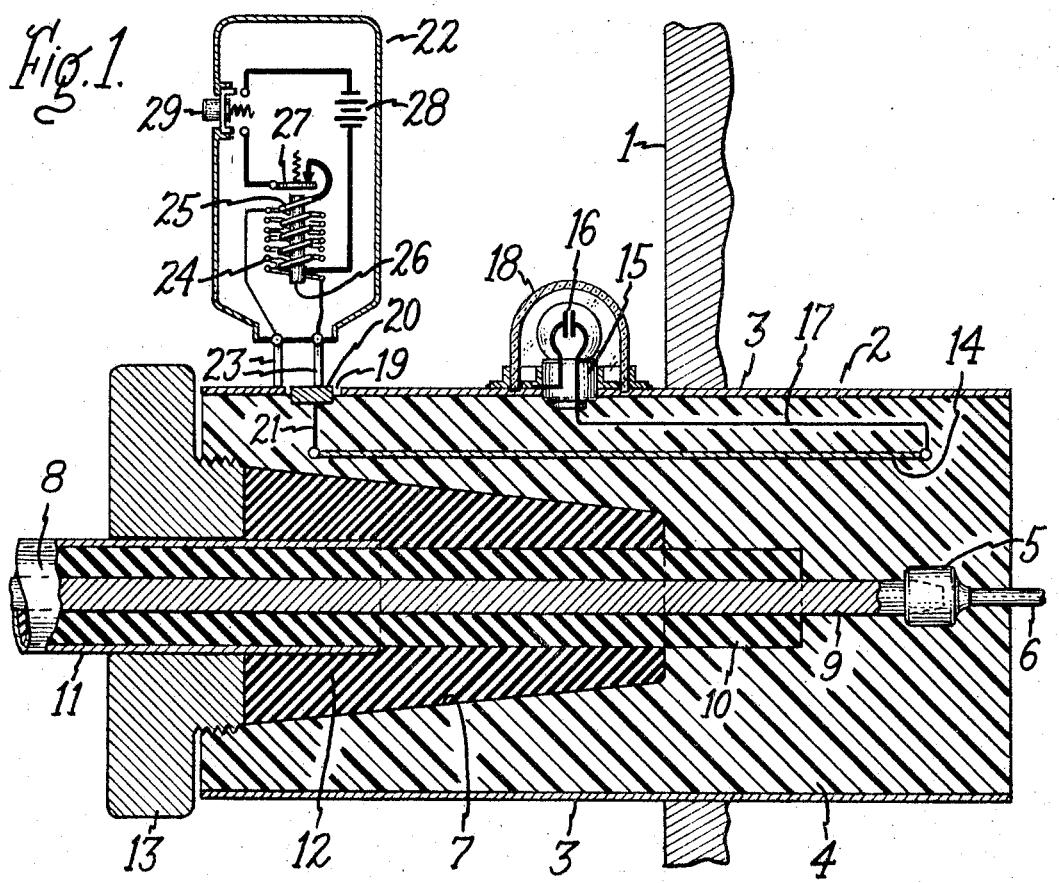
Figure 2:
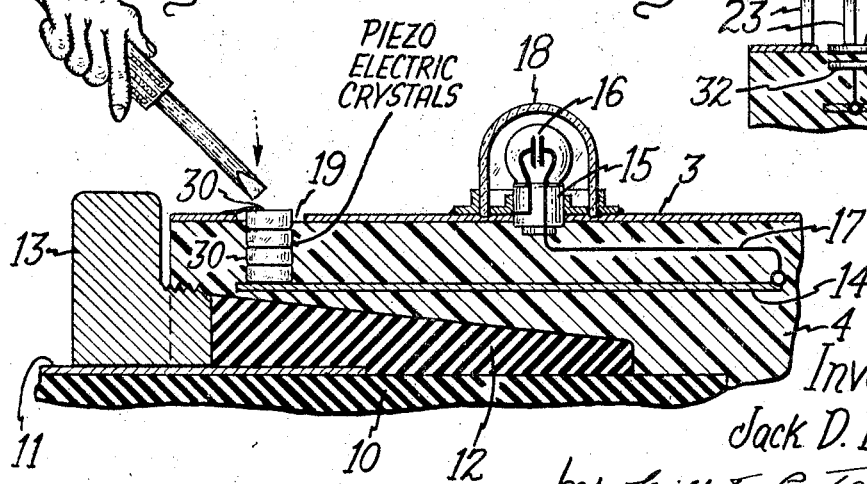
Figure 3:
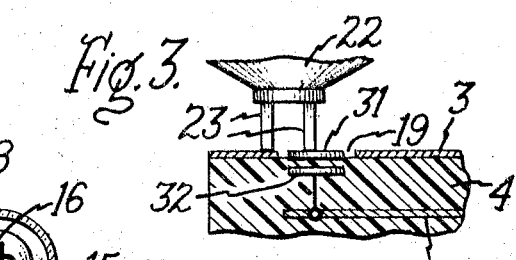

In the drawing,
FIG. 1 is a longitudinal sectional view of a cable termination connector provided with a voltage signaling element and a form of voltage test device,
FIG. 2 is a modification illustrating a different form of voltage test device, and
FIG. 3 is a further modification in which the voltage test device may be capacitively rather than conductively coupled to the signaling element through its normal energizing connections.

Referring now to the drawings and more particularly to FIG. 1, there is shown therein the outer wall 1 of a module of an underground electric power system through which extends a cylindrical member 2 having an outer normally grounded conductive sheath 3 usually of metal. The member 2 contains solid electrical insulation 4 within which at the inner end thereof is a socket 5 of a plug and socket type electrical connector which is permanently connected by a lead or cable 6 to whatever apparatus is in the module. The member 2 and its sheath 3 are open at the left and the insulation is provided with a conical surface 7. An insulated power cable 8 having a central conductor 9 surrounding insulation 10 and a normally grounded conductive or semi-conductive outer sheath or shield 11 is inserted in the conical opening of the member 2. As shown, the insulation 10 is stripped away from the right-hand end of the cable so that the bared conductor constitutes the plug portion of the plug and socket connector and it is fitted in the socket 5. The conductive or semi-conductive ground shield 11 is also stripped back and a resilient insulating stress cone 12 is slipped over the cable and covers the end of the conductive ground sheath or shield. The cone 12 fits the conical interior surface of the insulation 4 in the member 2 and it is compressed by a threaded hand nut 13 so as to secure the parts firmly together.

Also embedded in insulation 4 is a conductive surface 14 of metal foil or the like extending generally parallel to the cable conductor 9. Inserted in the sheath 3 is a socket 15 for a voltage signaling element such as a neon glow lamp 16, one terminal of the socket being connected to the metal sheath 3 and the other terminal being connected by a conductor 17 to one end of the conductive surface 14.

A transparent covering or weather dome 18 may be fitted over the lamp 16.

For testing the integrity of the surface 14, the socket 15, the lamp 16, and the connection 17, an opening 19 is provided in the conductive shield 3 and a metallic or otherwise conductive contact 20 embedded in the insulation 4 is connected by a lead 21 to the other end of the conductive surface 14.

For applying a test voltage between the conductive shield 3 and the contact 20, a portable auxiliary source 22 may be provided. This can be similar to a so-called cattle prod having a pair of electrode prongs 23 connected respectively to the ends of the high voltage winding 24 of an induction coil having a low voltage primary winding 25 on a magnetic core 26 with which is associated a vibrator 27 serially connected with the primary winding 25 through a battery 28 and a pushbutton switch 29.

In the normal condition of the power system, the conductive surface 14 will be capacitively coupled through the insulation 4 to the high voltage current carrying conductor 9 and will be at a voltage intermediate the voltage of the conductor 9 and ground. This voltage is applied through the connection 17 and the socket 15 to the electrodes of the glow lamp 16 so that lamp will normally be lighted. When the conductor 9 is deenergized or uncharged, the lamp 16 will normally be darkened. In order to test whether a darkened lamp is operative and whether it is capable of being operated through its normal energizing connections, the prongs 23 of the device 22 may contact respectively the sheath 3 and the contact 20 whereupon closure of the switch 29 will energize the vibrator and cause a test voltage to be induced in the secondary winding 24. This voltage will light the lamp 16 provided the conductive surface 14, the connecting lead 17, the socket 15 and its connection to the sheath 3 and the lamp 16 are in working order. Consequently, if the lamp 16 lights under these test conditions, but is not lighted otherwise, a very reliable indication is given that the main current carrying conductor 9 is uncharged.

In the modification shown in FIG. 2, the test device comprises one or a plurality of mechanically and electrically serially connected piezo electric crystals 30 embedded in the insulation 4 between the free end of the conductive surface 14 and the opening 19 in the sheath 3. By tapping on the outer end of the piezo electric crystal or stack of crystals with a screw driver or other suitable tool, test voltages will be applied between the sheath 3 and the free end of the conductive surface 14 so that the indicating device may be tested in generally the same way as described above for FIG. 1.

The advantage of the modification shown in FIG. 2 is, of course, that the test device is a permanent part of the apparatus instead of being a portable device. It is, therefore, always available and cannot be forgotten by a lineman.

In the modification shown in FIG. 3, the test voltage is capacitively rather than conductively coupled to the conductive surface 14 by providing a conductive surface 31 in the opening 19 which is capacitively coupled through the insulation 4 to the surface 14 as by an auxiliary surface 32.

While there have been shown and described particular embodiments of the invention, it will be obvious to those skilled in the art that changes and modifications may be made without departing from the invention, and therefore it is intended by the appended claims to cover all such changes and modifications as fall within the true spirit and scope of the invention.

What I claim as new and desire to secure by Letters Patent of the United States is:

1. A voltage test device for high voltage electric power systems comprising, in combination, a normally charged conductive member surrounded by a normally grounded conductive shield with electrical insulation therebetween, an electric signal electrically coupled to said conductive member so as to be energized through said coupling when said member is charged, and means (22) including an auxiliary source of voltage for energizing said electric signal thereby to test the operativeness of said signal without changing its coupling to said conductive member.

2. A voltage test device for high voltage electric power systems comprising, in combination, a normally charged conductive member surrounded by a normally grounded conductive shield with electrical insulation therebetween, an electric signal mounted on and connected to said shield and electrically coupled to said conductive member so as to be energized through said coupling when said member is charged, and means (22) including an auxiliary source of voltage for energizing said electric signal thereby to test in situ the operativeness of said signal when said conductive member is uncharged.

3. A voltage test device for a conductor in high voltage electric power systems comprising, in combination, a normally charged conductive member surrounded by a normally grounded conductive shield with electrical insulation therebetween, a conductive surface in said insulation between said member and said shield, an electric signal electrically connected between said shield and said surface and adapted to be actuated by the potential difference between said shield and said surface and adapted to be actuated by the potential difference between said shield and surface produced by capacitive coupling of said surface to said conductive member when it is charged, and means for testing the integrity of said surface and signal and its electrical connections comprising means including an auxiliary source of potential for charging said surface independently of the connection between said surface and said conductive member.

4. A voltage test device for detachable plug and socket connectors in insulated cable underground electric power distribution systems comprising, in combination, a normally charged member surrounded by a normally grounded conductive shield with solid electrical insulation therebetween, a conductive surface embedded in said insulation between said member and shield, an electric signal lamp connected between said shield and a point on said surface adapted to be actuated by the potential difference between said shield and surface produced by capacitive coupling to said connective member when it is charged, and means for testing the integrity of said surface and signal light comprising an auxiliary insulated conductor connected to another point on said surface and extending through said shield, and an auxiliary source of potential connectible between said auxiliary conductor and said shield.

5. A voltage test device as defined in claim 3 in which said auxiliary source comprises a piezo electric crystal.

6. A voltage test device for a separable connector that is adapted to releasably complete an electrical circuit between first and second high voltage conductive members, each of said conductive members being surrounded by insulating material and a conductive shield spaced radially therefrom, means defining an electrically conductive surface embedded in the insulating material surrounding said first conductive member, an electric signal means electrically connected to said means defining an electrically conductive surface and also electrically connected to a predetermined point between said first conductive member and the shield thereon which normally has a lower electric potential that is present on said surface, whereby said signal means is energized when a predetermined voltage drop occurs between said point and said surface, in combination with means for testing the integrity of said signal means, said means for testing comprising an auxiliary source of electric power and means for electrically connecting said auxiliary source to energize said signal means independently of the energization of said first and second conductive members, said means for electrically connecting said auxiliary source being effective to make its connection without interrupting the normal voltage sensing and indicating capability of the electric signal means.

References Cited
UNITED STATES PATENTS

| | | | |
|---|---|---|---|
| 2,691,698 | 10/1954 | Schmidt | 317—45 |
| 3,046,482 | 7/1962 | East | 324—133 |
| 3,343,153 | 9/1967 | Waehner | 340—252 |

THOMAS B. HABECKER, *Primary Examiner.*

U.S. Cl. X.R.

324—133, 51, 251